May 2, 1967 R. W. NORDIN 3,316,769
INTERMITTENT DRIVE
Filed July 6, 1965

INVENTOR
ROBERT W. NORDIN
BY *R. C. Terry.*
ATTORNEY

United States Patent Office 3,316,769
Patented May 2, 1967

3,316,769
INTERMITTENT DRIVE
Robert W. Nordin, Skokie, Ill., assignor to Teletype Corporation, Skokie, Ill., a corporation of Delaware
Filed July 6, 1965, Ser. No. 469,521
8 Claims. (Cl. 74—1.5)

This invention relates to an intermittent drive mechanism and more particularly to an escapement-controlled intermittent drive mechanism having means to slow the load before the load is stopped by the escapement.

Prior art escapement-controlled, intermittent-drive mechanisms have permitted the load to be steadily accelerated throughout the entire cycle of free movement of the escapement, thus, reaching peak load speed at the termination of a cycle of movement, causing maximum impact loading on the stopping pawl of the escapement with resulting noise, vibration, wear, and jarring of the load.

It is an object of the present invention to increase the speed of intermittent drives while reducing the noise generated by them.

Another object of this invention is to provide an intermittent drive with a drive cycle having a high initial acceleration of the load with less acceleration of the load later in its cycle.

A still further object of this invention is to provide an escapement controlled drive mechanism having a high initial acceleration of the load and a deceleration of the load later in its cycle to reduce the speed of the load toward the end of the cycle in order to minimize the impact and vibration incident to the stopping of the load.

In accordance with the preferred embodiment of the invention an escapement wheel carrying the desired load is normally blocked from rotation by an escapement pawl and is released for rotation whenever a cycle of movement is desired. This escapement wheel is driven by a torsion rod the other end of which is connected to a flywheel that is constrained for rotation in only one direction. In the idle condition, the escapement is blocked from rotation by the escapement pawl and the flywheel is in an advanced position winding a substantial amount of torque into the torsion rod, and the flywheel is prevented from retrograde motion under the urging of this reaction torque by a one-way brake. Upon release of the escapement wheel for one cycle of the operation, the escapement wheel and the load accelerate rapidly due to the torque wound in the torsion rod, completely unwinding the torsion rod and permitting the flywheel to begin movement in the forward direction under the urging of a second drive spring. At this point the escapement wheel rapidly outruns the flywheel and begins winding the torsion rod in the opposite direction, decelerating the escapement wheel and load. The escapement wheel then strikes the escapement pawl abruptly stopping, and the flywheel continues rotating in the forward direction until the torsion rod has again been wound up to the desired torque; whereupon, the reaction torque from the torsion rod stops the flywheel, and retrograde movement of the flywheel is prevented by the one-way brake.

A complete understanding of the invention may be had by reference to the following detailed description when considered in conjunction with the accompanying drawings wherein.

Figure 1:
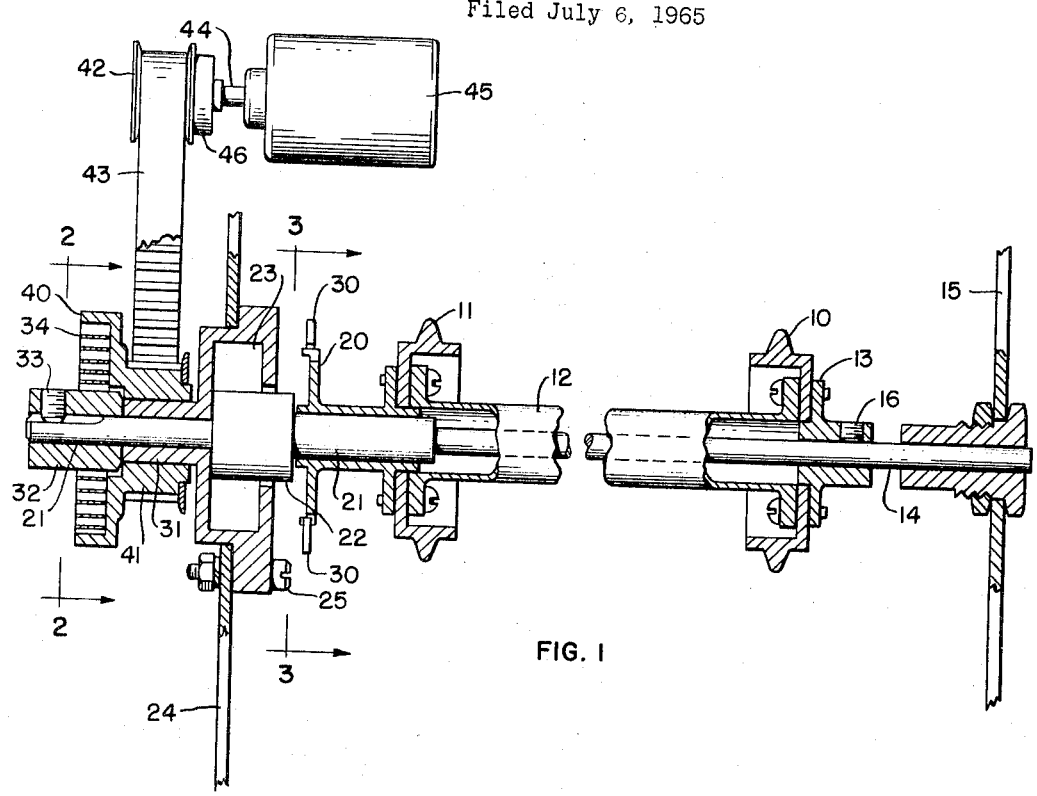
FIG. 1 is a partial sectional view of the spring-mass-escapement system for driving the desired load.

In the preferred embodiment of the invention as illustrated in FIG. 1, there is shown a paper-feeding sprocket mechanism for use in a high-speed telegraph page-printing machine for feeding paper through the printer at rapid rates wherein each cycle of the paper-feeding operation must be accomplished in four milliseconds or less. Holes in the paper are engaged by pins in sprocket wheels 10 and 11. These sprocket wheels are connected by a stiff tie tube 12 to assure that they rotate together. This sprocket feed structure is connected at its right end to a hub 13 which is in turn firmly fixed to a torsion rod 14 by screw 16. Torsion rod 14 is rotatably supported by the right side frame 15 of the machine. The left sprocket wheel 11 is firmly attached to an escapement wheel 20 which is rotatably mounted on a shaft 21 and normally locked from rotation by an escapement pawl 30. Shaft 21 is firmly fixed to or is an integral part of torsion rod 14 so that the paper feed structure comprising sprocket wheels 10 and 11 together with tie tube 12 and escapement wheel 20 can rotate about shaft 21. Any relative movement between escapement wheel 20 and shaft 21 is accompanied by a twisting of torsion rod 14 which thus tends to restore the sprocket-feed structure to a neutral position with respect to shaft 21.

Shaft 21 has a flywheel 22 formed integrally with it which also forms the hub portion of a one-way brake 23, that is in turn mounted on the left side frame 24 of the machine by a screw 25. Whenever escapement pawl 30 is in engagement with escapement wheel 20 preventing its movement, and flywheel 22 is rotated in the direction of the desired paper feed, reaction torque is built up in torsion rod 14 tending to rotate escapement wheel 20 and sprocket feed wheels 10 and 11 in a direction to feed paper through the high speed telegraph printer. The reaction torque of the torsion rod 14 as applied to the flywheel 22 is prevented from similarly rotating the flywheel 22 in the reverse direction by the action of one-way brake 23 which permits rotation of the flywheel 22 only in the direction of desired paper feed.

Figure 2:
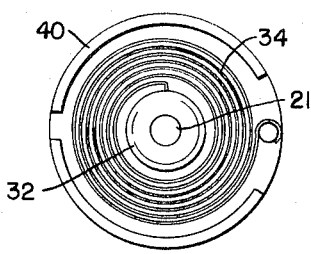
FIG. 2 is an end view showing the spiral clock spring of the mechanism taken along lines 2—2 of FIG. 1.

In order to drive flywheel 22, shaft 21 projects further from the left side of flywheel 22 and is supported in an internal/external bearing member 31 which is an extension of the frame structure of one-way brake 23. A collar 32 is attached to the left-hand end of shaft 21 by a set screw 33, and one end of a spiral clock spring 34 (FIG. 2) is attached to collar 32 and is wound so as to apply a steady torque to the collar 32 and shaft 21 in the direction of desired paper feed.

Figure 3:
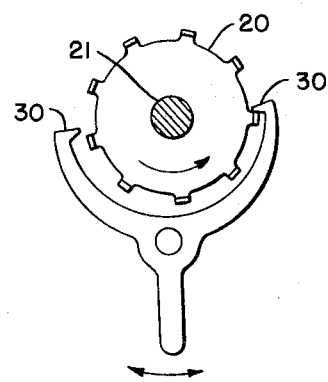
FIG. 3 is a sectional view taken along line 3—3 of FIG. 1 and shows the escapement wheel and escapement pawl.

When the escapement pawl 30 (FIG. 3) releases escapement wheel 20 to permit one cycle of movement of the paper-feed sprockets 10 and 11, torsion rod 14 drives the paper feed mechanism forward due to the reaction torque stored in the torsion rod.

Figure 4:
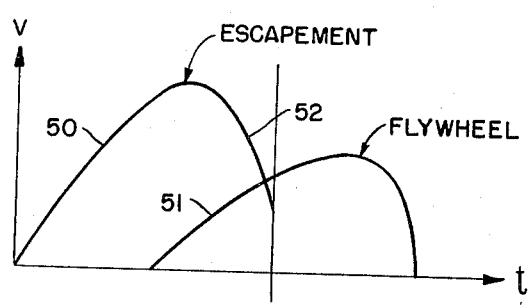
FIG. 4 is a velocity vs. time graph of a typical cycle of the intermittent drive mechanism showing the approximate relationship between speeds and times-of-operation of the escapement and flywheel.

This rapid acceleration of the escapement wheel 20 and sprocket wheels 10 and 11 is represented as line 50 on the graph of FIG. 4. When sufficient of the torque stored in torsion rod 14 has been dissipated to the extent that the reaction torque applied to the shaft 21 by the left-hand end or torsion rod 14 is slightly less than the torque applied to the collar 32 by the spiral clock spring 34, flywheel 22 begins slowly to rotate in the direction of motion of the paper feed. This slow acceleration of flywheel 22 is represented by line 51 in FIG. 4. However by the time that flywheel 22 begins rotating, the escapement wheel 20 and paper feed sprockets 10 and 11 are far out-speeding the flywheel 22 with the effect that torsion rod 14 is completely unwound and the mass of escapement wheel 20 together with sprocket-feed wheels 10 and 11 winds torsion rod 14 in the opposite direction decelerating the paper feed mechanism and escapement wheel 20. This is represented as line 52 in FIG. 4.

The spring rate of torsion rod 14 is so proportioned together with the mass of the escapement wheel 20, paper feed sprockets 10 and 11, tie tube 12, and flywheel 22 together with collar 32 to which it is firmly fixed, that the paper-feed sprockets 10 and 11 are significantly decelerated before the next tooth on escapement wheel 20 strikes escapement pawl 30 to abruptly stop the feed sprockets 10 and 11, resulting in a significant reduction in the amount of wear, noise and vibration over prior art escapement feed mechanisms.

These same spring rates and masses are also so proportioned that before escapement wheel 20 and feed sprockets 10 and 11 can rebound significantly from escapement pawl 30, flywheel 22 unwinds the reverse torque stored in torsion rod 14 from decelerating the escapement wheel and sprocket wheels, and flywheel 22 begins winding torsion rod 14 in the forward direction again in preparation for the next paper-feed cycle. This forward torque maintains the next tooth on escapement wheel 20 firmly pressed against escapement pawl 30. Flywheel 22 continues rotating in the forward direction until sufficient reaction torque is developed by torsion rod 14 to stop flywheel 22 from further rotation and begin urging flywheel 22 to retrogress. Retrograde movement of flywheel 22 would unwind torsion rod 14 and is, therefore, prevented by one-way brake 23.

Spiral clock spring 34 which drives flywheel 22 in the direction of the desired paper feed is in turn connected to and driven by a cup-shaped extension 40 of a toothed pulley 41. Toothed pulley 41 is driven by a pinion 42 through a toothed belt 43. In order to prevent overwinding of spiral clock spring 34, toothed pinion 42 is coupled to the continuously-rotating drive shaft 44 of a motor 45 by a torque-limiting coupling 46 which begins slipping whenever the reaction torque for the spiral clock spring 34 exceeds a predetermined value.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

1. An escapement-controlled driving apparatus for imparting step-by-step movement to a driven member comprising:
    a drive source constantly rotating in one direction;
    a torque-limiting coupling driven by the constantly-rotating drive source;
    an energy storage spring of a predetermined stiffness driven at one end thereof by the torque-limiting coupling for storing driving energy;
    a flywheel driven in said one direction by the other end of the energy storage spring;
    a unidirectional brake for permitting rotation of the flywheel in only said one direction;
    a drive spring having a stiffness substantially greater than said energy storage spring and driven by the flywheel;
    an escapement wheel firmly connected to said driven member and driven by the drive spring; and
    means for preventing rotation of the escapement wheel and for selectively releasing the escapement wheel for rotation.

2. A mechanism for driving an escapement-controlled load comprising:
    a constantly-rotating drive source;
    a torque-limiting coupling driven by the constantly-rotating drive source;
    an energy storing spring driven at one end by the torque-limiting coupling;
    a flywheel connected to and driven by the other end of the spring;
    means for permitting rotation of the flywheel in only one direction;
    a flexible torque rod connected to and driven by the flywheel;
    an escapement wheel connected to said load and driven by the torque rod; and
    means for preventing rotation of the escapement wheel and for selectively releasing the escapement wheel for rotation.

3. An escapement-controlled driving apparatus for driving a load device comprising:
    means for providing a constant driving torque;
    a flywheel driven at one end thereof by said torque providing means;
    means for permitting rotation of the flywheel in only one direction;
    a resilient coupling having one end connected to the flywheel the other end connected to said load device;
    an escapement member fixed to said load device and driven by the other end of the resilient coupling; and
    means for preventing rotation of the escapement member and for selectively releasing the escapement member for rotation.

4. An intermittent motion device for driving a driven member comprising:
    means for providing a constant-drive torque;
    an inertia member urged to move in one direction by said constant-drive torque means;
    means for constraining said inertia member to move only in said one direction;
    means for limiting movement of the driven member; and
    a resilient coupling connected between the inertia member and the driven member for urging the driven member to move in the same direction as the inertia member when the movement-limiting means permits movement of the driven member.

5. A device according to claim 4 wherein:
    the movement-limiting means permits movement in fixed angular increments; and
    the resilient coupling is deformed angularly less than said fixed angular increment.

6. An intermittent motion device comprising:
    means for providing a constant drive torque;
    a flywheel urged to rotate in one direction by the torque means;
    means for constraining said flywheel to move only in said one direction;
    a load means connected to the flywheel for resiliently urging the load to rotate; and
    means for selectively limiting movement of the load.

7. An intermitttent drive mechanism for imparting step-by-step movement to a driven member comprising:
    a selectively operable escapement means normally blocking movement of said member and for selectively releasing said member for a single step of movement in one direction;
    a resilient torsion element having one end connected to said member for applying a predetermined force tending to drive said member in said one direction;
    means connected to the other end of said torsion element for preventing movement of the torsion element in the opposite direction;
    inertia means connected to the other end of said torsion element for retarding movement of the other end of the torsion element; and
    driving means for continuously applying a predetermined force to said inertia means for urging said inertia means to rotate in said one direction.

8. An intermittent drive mechanism for moving a driven load in discrete steps having a constantly-rotating drive source providing drive force in one direction of up to a predetermined magnitude to an energy storage means for storage and delivery of drive energy to said load comprising:

- a selectively operable escapement means normally blocking movement of said driven load and operable to release said load for a single step of movement in said one direction;
- a torsion element having one end connected to said load for applying drive force tending to drive said load in said one direction;
- a one-way brake means connected to the other end of the torsion element for preventing movement of the torsion element in the opposite direction; and
- a flywheel connected to the other end of the torsion element to retard movement of the other end of the torsion element in said one direction, said flywheel connected to and driven by said storage means.

References Cited by the Examiner

UNITED STATES PATENTS 2,934,339  4/1960  Davis et al. _____ 226—156

References Cited by the Applicant

UNITED STATES PATENTS 2,098,940  11/1937  Blohm.

MILTON KAUFMAN, *Primary Examiner.*

UNITED STATES PATENT OFFICE
CERTIFICATE OF CORRECTION

Patent No. 3,316,769                                May 2, 1967

Robert W. Nordin

It is certified that error appears in the above identified patent and that said Letters Patent are hereby corrected as shown below:

Column 4, between lines 51 and 52, insert -- a load; --/ as a separate element and subparagraph; line 52, cancel "a load".

Signed and sealed this 17th day of March 1970.

(SEAL)
Attest:

Edward M. Fletcher, Jr.                      WILLIAM E. SCHUYLER, JR.
Attesting Officer                               Commissioner of Patents